United States Patent
MacArthur et al.

(10) Patent No.: US 11,840,274 B2
(45) Date of Patent: Dec. 12, 2023

(54) METHODS AND SYSTEMS FOR PROTECTING A STEERING COLUMN FROM DEBRIS

(71) Applicant: Honda Motor Co., Ltd., Tokyo (JP)

(72) Inventors: Benjamin MacArthur, Barrie (CA); Thien Phung, Barrie (CA); Dave Kelly, Barrie (CA)

(73) Assignee: Honda Motor Co., Ltd., Tokyo (JP)

( * ) Notice: Subject to any disclaimer, the term of this patent is extended or adjusted under 35 U.S.C. 154(b) by 2 days.

(21) Appl. No.: 17/668,841

(22) Filed: Feb. 10, 2022

(65) Prior Publication Data
US 2023/0249736 A1    Aug. 10, 2023

(51) Int. Cl.
B62D 1/18 (2006.01)
B62D 1/184 (2006.01)
B62D 1/185 (2006.01)

(52) U.S. Cl.
CPC ............... B62D 1/18 (2013.01); B62D 1/184 (2013.01); B62D 1/185 (2013.01)

(58) Field of Classification Search
CPC ................................ B62D 1/184; B62D 1/185
See application file for complete search history.

(56) References Cited

U.S. PATENT DOCUMENTS

| | | | | |
|---|---|---|---|---|
| 3,803,939 A | * | 4/1974 | Schenten | B62D 1/184 280/775 |
| 4,195,535 A | * | 4/1980 | Broucksou | B62D 1/18 403/109.5 |
| 4,682,787 A | * | 7/1987 | Ruhter | B62D 1/18 280/775 |
| 5,088,342 A | * | 2/1992 | Bening | B62D 1/184 280/775 |
| 2003/0094061 A1 | * | 5/2003 | Cartwright | B62D 1/184 280/775 |
| 2006/0097500 A1 | * | 5/2006 | Peppler | B62D 1/184 280/775 |
| 2007/0273130 A1 | * | 11/2007 | Cartwright | B62D 1/184 280/731 |
| 2011/0314953 A1 | * | 12/2011 | Nakamura | B62D 1/184 74/493 |
| 2012/0146316 A1 | * | 6/2012 | Roach | B62D 1/184 29/525.08 |
| 2021/0213999 A1 | * | 7/2021 | Ziebold | B62D 1/187 |

FOREIGN PATENT DOCUMENTS

| | | | |
|---|---|---|---|
| CN | 220458699 U | 8/2015 | |
| CN | 206634052 U | 11/2017 | |
| CN | 108973885 A | 12/2018 | |
| CN | 113071556 A | * 7/2021 | ............ B60K 35/00 |

(Continued)

*Primary Examiner* — Nicole T Verley
(74) *Attorney, Agent, or Firm* — Stinson LLP

(57) ABSTRACT

A system protects a steering column from debris. The system includes a pair of arms moveable between a closed configuration and an open configuration, and a vertical member configured to move toward a lower position when the steering column is positioned thereon. The vertical member is coupled to the pair of arms such that the pair of arms move toward the closed configuration and facilitate protecting the steering column from the debris when the vertical member is moved toward the lower position.

19 Claims, 6 Drawing Sheets

(56) References Cited

FOREIGN PATENT DOCUMENTS

| | | | | |
|---|---|---|---|---|
| DE | 102013220567 | A1 | 4/2015 | |
| DE | 112018004760 | T5 * | 6/2020 | ............. B62D 1/184 |
| EP | 0481432 | A1 * | 4/1992 | |
| EP | 1057710 | A2 * | 12/2000 | ........... B60R 21/203 |
| EP | 1201526 | A2 * | 5/2002 | ............. B60K 23/02 |
| EP | 2228251 | B1 * | 10/2012 | ............. B60N 2/161 |
| EP | 2228252 | B1 * | 10/2012 | ........... B60N 2/1615 |
| EP | 2487088 | B1 * | 11/2013 | ............. B62D 1/183 |
| EP | 3845435 | A1 * | 7/2021 | ............. B60K 35/00 |
| FR | 2919842 | A1 * | 2/2009 | ............... B62D 1/18 |
| JP | 2015137052 | A * | 7/2015 | |
| JP | 2016187973 | A * | 11/2016 | |
| SE | 0950229 | A1 * | 10/2010 | |
| SE | 1451400 | A1 * | 5/2016 | |
| SE | 1451401 | A1 * | 5/2016 | |
| SE | 1550293 | A1 * | 9/2016 | |
| WO | WO-2006108631 | A1 * | 10/2006 | ............. B01D 15/22 |
| WO | WO-2007127962 | A2 * | 11/2007 | ....... B60R 25/02153 |

* cited by examiner

METHODS AND SYSTEMS FOR PROTECTING A STEERING COLUMN FROM DEBRIS

BACKGROUND

Some manufacturers use tamper-resistant fasteners to discourage removal of one or more components. Such fasteners may be used, for example, to couple an ignition switch to a steering column and/or a steering column to a vehicle frame. At least some known tamper-resistant fasteners include a shaft and a head that is configured to break, snap, or shear off when a predetermined amount of force or torque is applied to it (e.g., during installation). After being sheared off, the head and/or other debris could end up in one or more undesirable locations. The accumulation of debris in and/or around a steering column, for example, could negatively affect steering.

SUMMARY

Examples of this disclosure facilitate protecting a steering column from debris. In one aspect, a system is provided to protect a steering column from debris. The system includes a pair of arms moveable between a closed configuration and an open configuration, and a vertical member configured to move toward a lower position when the steering column is positioned thereon. The vertical member is coupled to the pair of arms such that the pair of arms move toward the closed configuration and facilitate protecting the steering column from the debris when the vertical member is moved toward the lower position.

In another aspect, a system is provided. The system includes one or more arms moveable between a closed configuration and an open configuration, and a vertical member moveable between an in-use position and a non-use position. The vertical member is configured to move toward the in-use position when an object is positioned thereon. The vertical member is coupled to the arms such that the arms move toward the closed configuration when the vertical member is moved toward the in-use position and toward the open configuration when the vertical member is moved toward the non-use position.

In yet another aspect, a method is provided for assembling a system for use in protecting a steering column from debris. The method includes orienting a vertical member such that the vertical member is configured to move generally vertically between an in-use position and a non-use position, and coupling a pair of arms to the vertical member such that the pair of arms are configured to move toward a closed configuration and facilitate protecting the steering column from the debris when the vertical member is moved toward the in-use position. The vertical member is urged to move downward toward the in-use position when the steering column is positioned thereon.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Examples described below will be more clearly understood when the Detailed Description is considered in conjunction with the accompanying drawings, in which.

Figure 1:
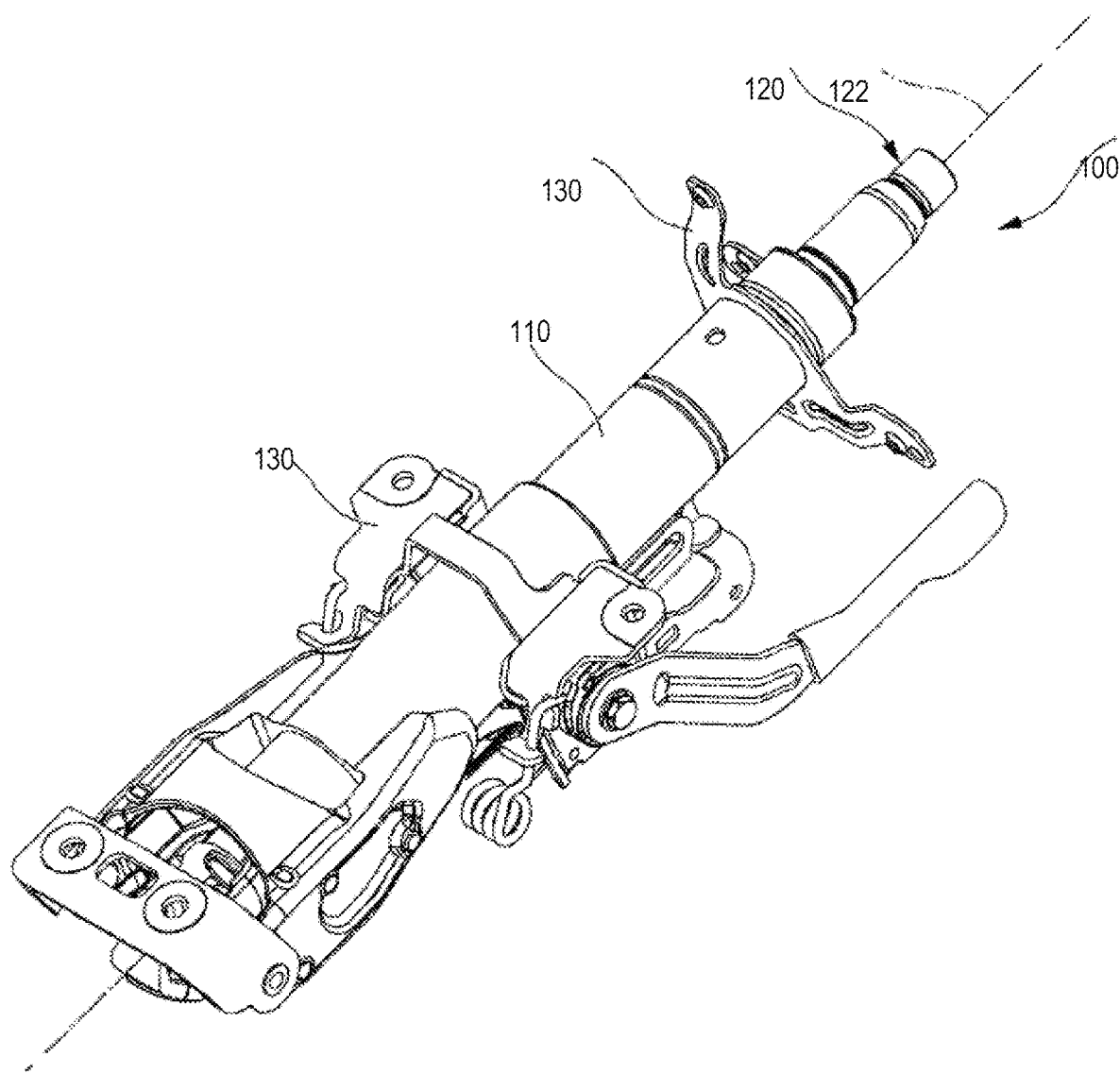
FIG. 1 is a perspective view of an example steering column.

It should be noted that these drawings are intended to illustrate the general characteristics of methods, structures, and/or materials utilized in the examples and to supplement the Detailed Description provided below. These drawings are not, however, to scale and may not precisely reflect the precise structural or performance characteristics of any given example, and should not be interpreted as defining or limiting the range of values or properties encompassed by the examples.

Corresponding reference characters indicate corresponding parts throughout the drawings. Although specific features may be shown in some of the drawings and not in others, this is for convenience only. In accordance with the examples described herein, any feature of a drawing may be referenced and/or claimed in combination with any feature of any other drawing.

DETAILED DESCRIPTION

The present disclosure relates to manufacturing systems and, more particularly, to methods and systems for protecting a steering column from debris. Examples described herein include one or more arms and a vertical member coupled to the arms such that the arms are moveable toward a closed configuration when the vertical member is moved toward an in-use position. In this manner, the steering column may be protected from the accumulation of debris falling from above. Other benefits and advantages will become clear from the disclosure provided herein, and those advantages provided are for illustration.

Certain terminology is used in the present disclosure for convenience and reference only and not in a limiting sense. For example, the terms "lower," "upper," "downward," "upward," "vertical," "above," "under," and the like designate directions in relation to the perspective shown in the drawings. One of ordinary skill in the art would understand and appreciate that the example methods and systems may be used in various orientations.

FIG. 1 shows an example steering column 100 including an outer member 110 and a steering shaft 120 coupled to the outer member 110. The steering shaft 120 is rotatable about an axis 122 extending longitudinally along the outer member 110 and/or steering shaft 120. As shown in FIG. 1, the steering column 100 may include one or more brackets 130 that enable the steering column 100 to be coupled to one or more other vehicle components. A tamper-resistant fastener, for example, may be extended through an opening defined in a bracket 130 and coupled to a vehicle frame or body (not shown).

Figure 2:
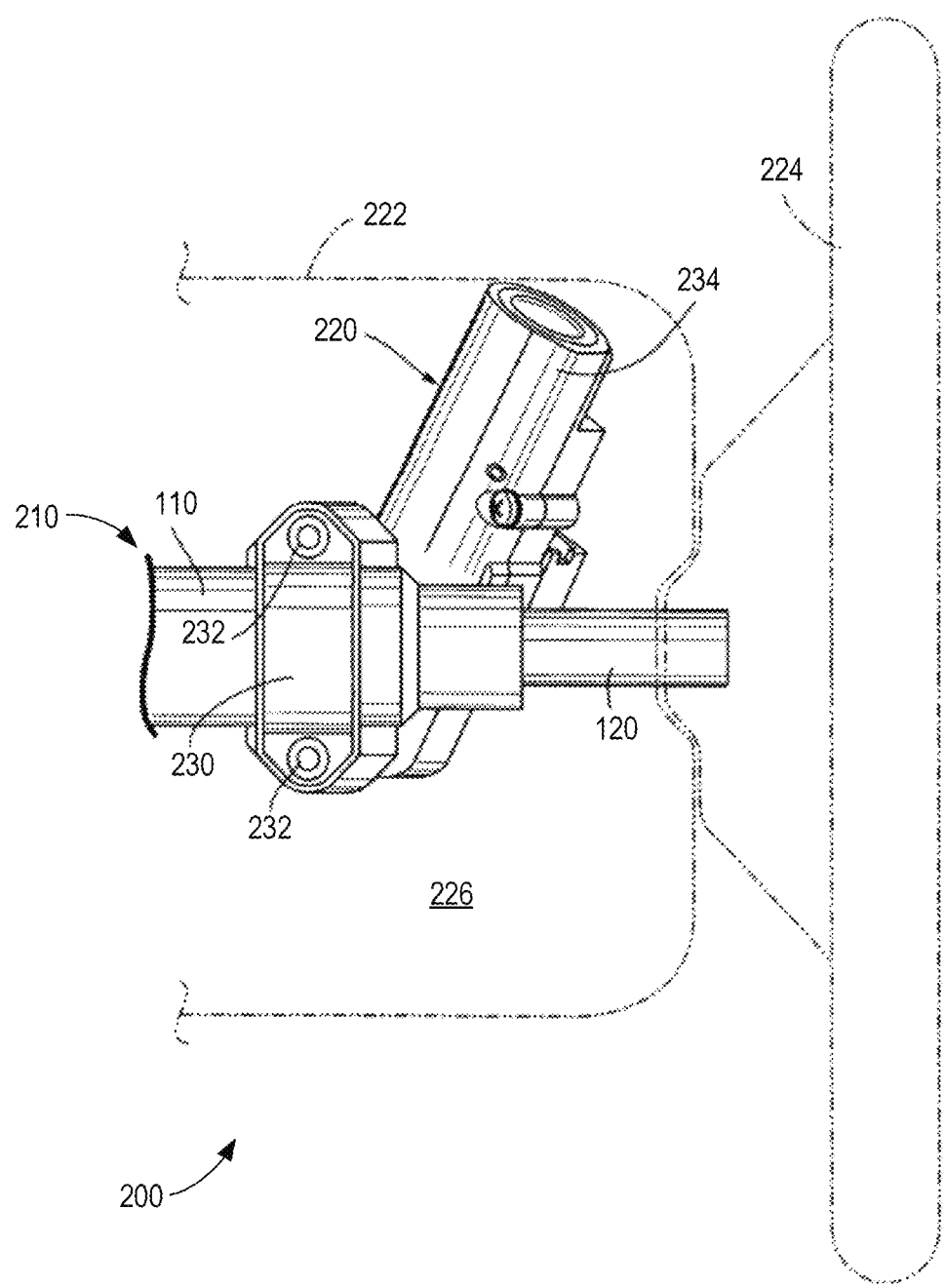
FIG. 2 is a side view of an example steering assembly including a steering column, such as the steering column shown in FIG. 1.

FIG. 2 shows an example steering assembly 200 including a steering column 210 (e.g., steering column 100) and an ignition lock housing 220 coupled to the steering column 210. As shown in FIG. 2, an upper end portion of the steering column 210 (e.g., steering shaft 120) may extend from a blind 222 and be coupled to a steering wheel 224. The blind 222 defines a space 226 in which an upper body portion of the steering column 210 (e.g., outer member 110, steering shaft 120) and the ignition lock housing 220 may be housed. In some examples, the blind 222 includes one or more portions that are coupled to each other using one or more tamper-resistant fasteners.

The ignition lock housing 220 may house one or more components, such as an ignition switch (not shown). The ignition lock housing 220 is configured to protect the components housed therein, for example, from tampering and/or other unauthorized access. In some examples, a mount member 230 (e.g., bracket 130) enables the ignition lock housing 220 to be mounted onto the steering column 210. As shown in FIG. 2, the mount member 230 may extend at least partially around the upper body portion 212 of the steering column 210, and one or more tamper-resistant fasteners 232 may extend through one or more openings defined in the mount member 230 and be coupled to a body 234 of the ignition lock housing 220.

Figure 3:
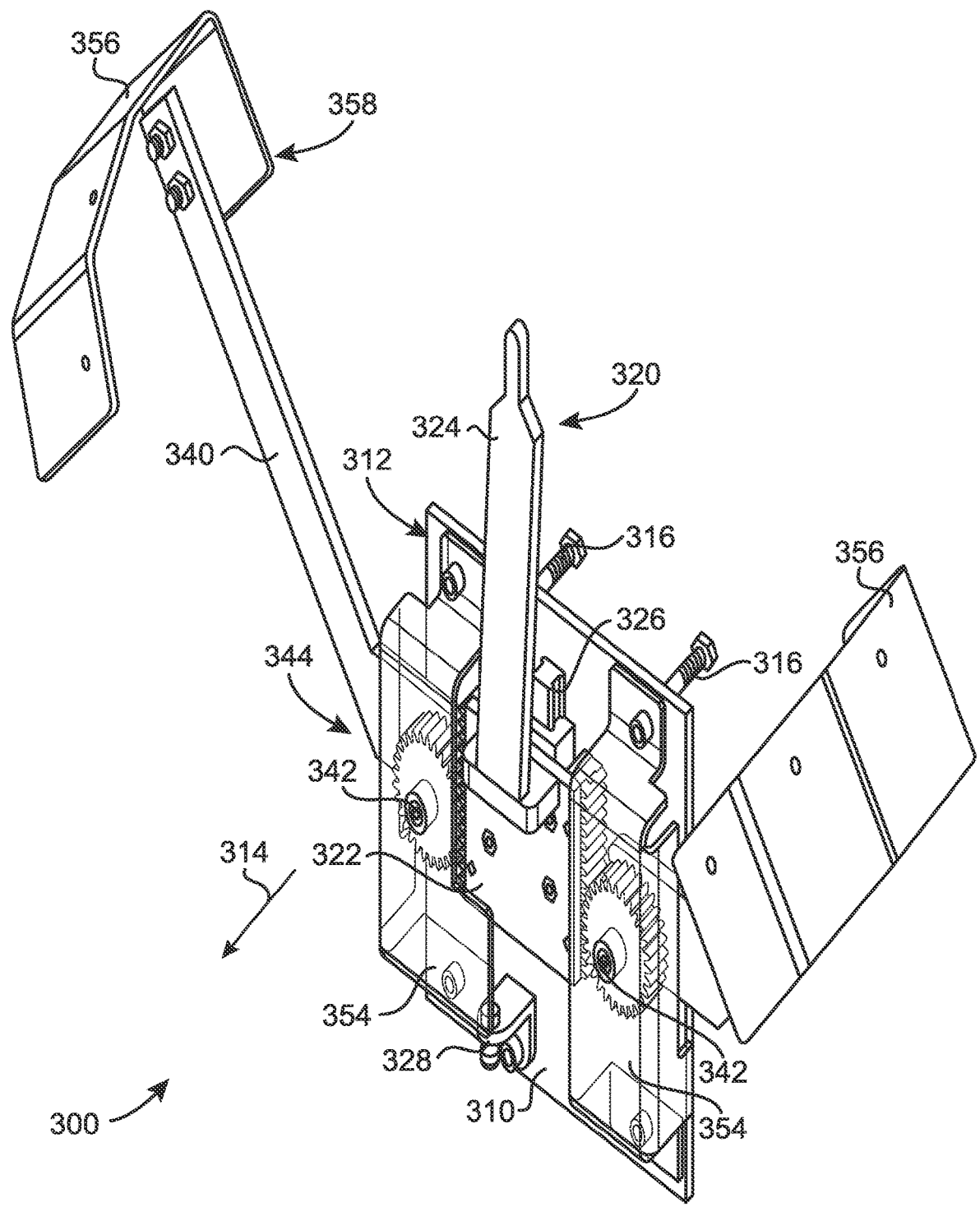
FIG. 3 is a perspective view of an example system that may be used to protect a steering column, such as the steering column shown in FIG. 1.
Figure 4:
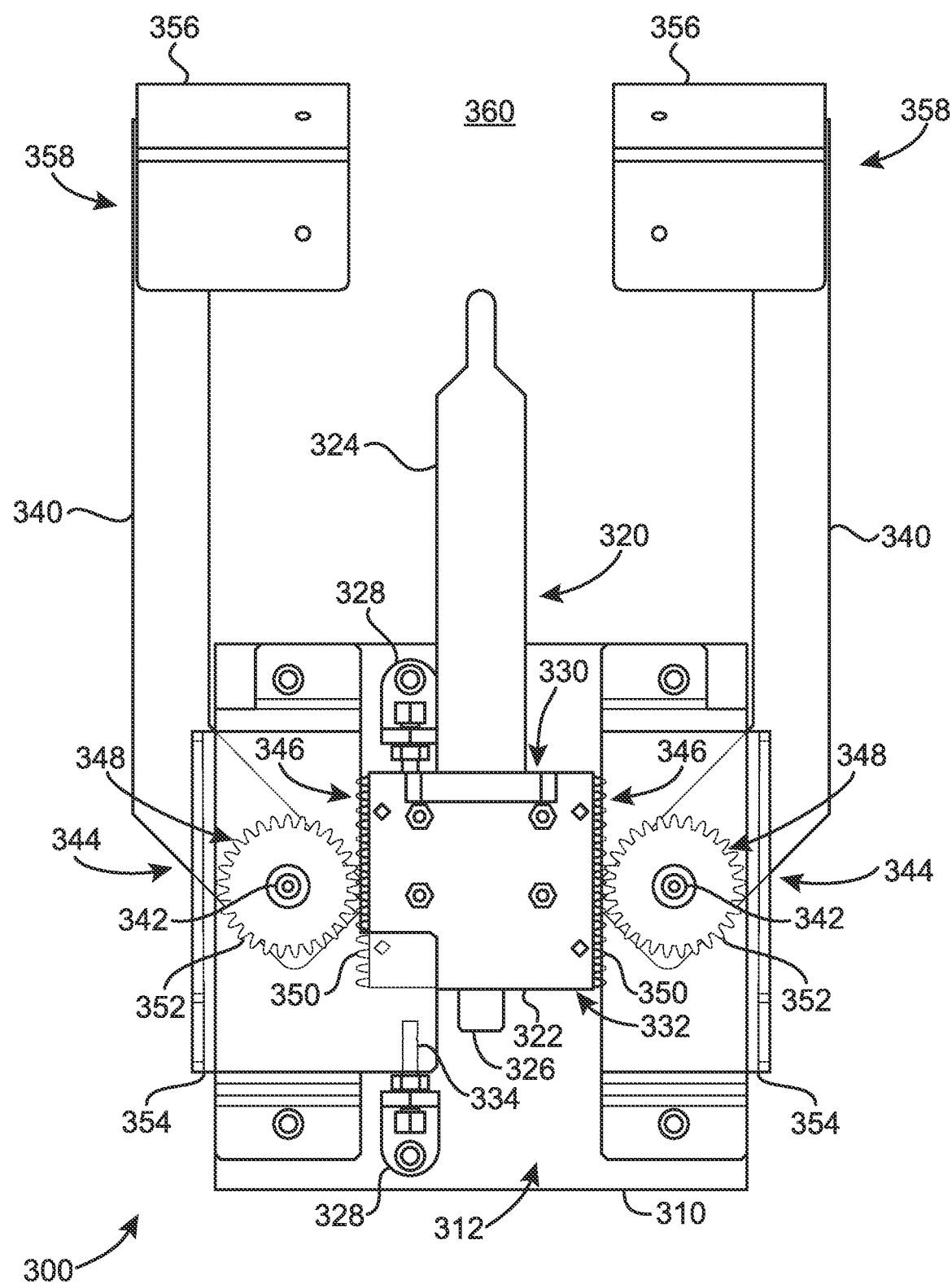
FIG. 4 is a front view of the system shown in FIG. 2 in a closed configuration.
Figure 5:
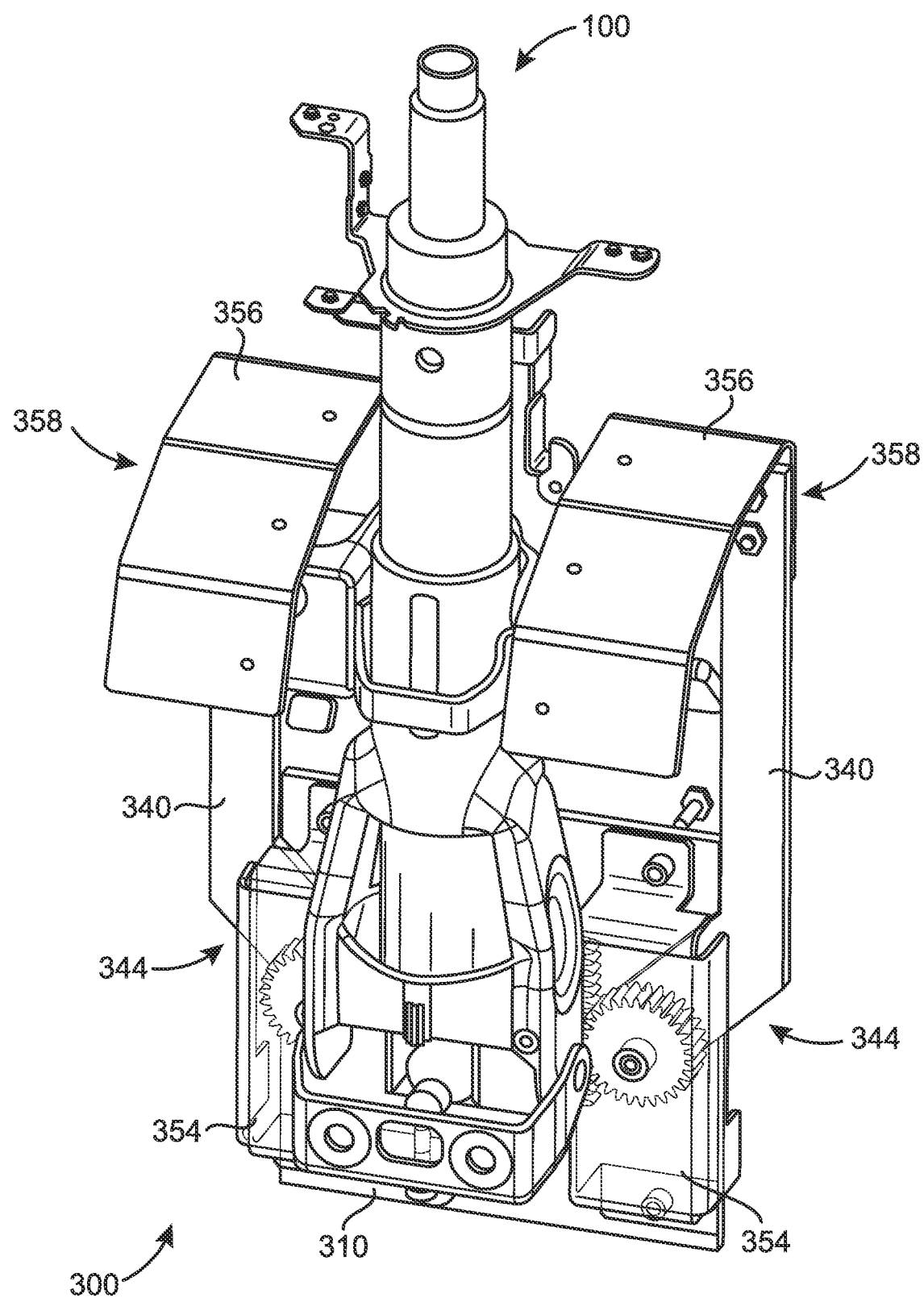
FIG. 5 is a perspective view of the system shown in FIG. 2 in the closed configuration during use.

FIGS. 3 and 4 show an example system or jig 300 that may be used to protect a steering column 100 from debris, such as a head of a tamper-resistant fastener 232. FIG. 5 shows the jig 300 in use, with the steering column 100 coupled thereto. In some examples, the jig 300 includes a base 310 including a first surface 312. As shown in FIG. 3, the base 310 may be planar or substantially planar and oriented such that the first surface 312 faces a first direction 314 (e.g., toward a user of the jig 300). In some examples, one or more coupling members 316 (shown in FIG. 3) extend through one or more openings defined through the base 310 for use in mounting the jig 300 to a structure. Example coupling members 316 may include, without limitation, a screw, a bolt, a stud, a rod, and/or any other fastener configured to couple the base 310 to one or more objects.

The jig 300 includes a vertical member 320 configured to move between a non-use position (shown, e.g., in FIG. 3) and an in-use position (shown, e.g., in FIG. 4). In some examples, the vertical member 320 includes a plate element 322 and a rod element 324 extending generally upward from the plate element 322. The rod element 324 is configured to receive one or more steering columns 100. For example, a steering column 100 may be positioned onto the rod element 324 such that the rod element 324 extends through a space defined in a lower portion of the steering column 100. As shown in FIG. 5, the steering column 100 may extend generally vertically when positioned onto the rod element 324.

The vertical member 320 may be slidably coupled to the base 310 such that the vertical member 320 is configured to slide between the non-use position and the in-use position. For example, the plate element 322 may be mounted on a rail 326 coupled to the first surface 312 of the base 310. In some examples, the rail 326 extends vertically or substantially vertically such that the plate element 322 is configured to slide along the rail 326 in a vertical direction (e.g., upward, downward). In this manner, the vertical member 320 may be urged (e.g., via gravity) to move downward toward the in-use position when the steering column 100 is positioned thereon.

In some examples, the jig 300 includes one or more stoppers 328 configured to restrict movement of the vertical member 320 in the vertical direction. For example, an upper stopper 328 may be positioned such that an upper surface 330 (shown in FIG. 4) of the plate element 322 engages the upper stopper 328 when the vertical member 320 is in the non-use position, and/or a lower stopper 328 may be positioned such that a lower surface 332 (shown in FIG. 4) of the plate element 322 engages the lower stopper 328 when the vertical member 320 is in the in-use position. In this manner, the upper stopper 328 may be configured to restrict upward movement of the vertical member 320, and the lower stopper 328 may be configured to restrict downward movement of the vertical member 320.

The jig 300 may include one or more biasing members 334 (shown in FIG. 4) that limit or control movement of the vertical member 320. As shown in FIGS. 3 and 4, the biasing members 334 may be coupled and/or positioned adjacent to the stoppers 328. Additionally or alternatively, one or more biasing members 334 may be spaced from the stoppers 328. In some examples, the biasing members 334 are configured to absorb or dampen one or more shock impulses (e.g., a relatively sudden change in acceleration or force). For example, when engaged by the vertical member 320, the biasing members 334 may exert an opposing force onto the vertical member 320. In some examples, the biasing members 334 are configured to bias the vertical member 320 to move away from the in-use position and/or toward the non-use position. Example biasing members 334 may include, without limitation, a coil spring, a leaf spring, a torsion bar, and/or any other elastic object configured to store or absorb energy.

The jig 300 includes a pair of arms 340 configured to move between an open configuration (shown, e.g., in FIG. 3) and a closed configuration (shown, e.g., in FIG. 4). In some examples, the arms 340 are rotatably coupled to the base 310 such that the arms 340 are configured to rotate between the open configuration and the closed configuration. For example, a respective coupling member 342 may be extended through an opening defined through a proximal portion 344 of each arm 340 and coupled to the base 310. Example coupling members 342 may include, without limitation, a screw, a bolt, a stud, a rod, and/or any other fastener configured to couple the coupling member 342 to the base 310.

The arms 340 may be coupled to the vertical member 320 such that the arms 340 are configured to move toward the open configuration when the vertical member 320 is moved toward the non-use position and/or toward the closed configuration when the vertical member 320 is moved toward the in-use position. In some examples, the vertical member 320 and arms 340 include or are coupled to one or more first teeth 346 (shown in FIG. 4) and one or more second teeth 348 (shown in FIG. 4), respectively. The first teeth 346 and second teeth 348 may complement and cooperate with each other such that the vertical member 320 and arms 340 move in tandem as the first teeth 346 and second teeth 348 engage each other. For example, as shown in FIGS. 3 and 4, the vertical member 320 may include a pair of linear gears or racks 350 (shown in FIG. 4) including a plurality of first teeth 346, and each arm 340 may include a respective circular gear or pinion 352 (shown in FIG. 4) at the proximal portion 344 including a plurality of second teeth 348.

The racks 350 are configured to engage the pinions 352 to translate linear motion of the vertical member 320 into rotational motion of the arms 340. For example, when the vertical member 320 moves downward toward the in-use position (e.g., because the steering column 100 is positioned thereon), the left rack 350 and right rack 350 may urge the left pinion 352 and right pinion 352 to rotate in a clockwise rotation and counterclockwise direction, respectively (e.g., toward the closed configuration). On the other hand, when the vertical member 320 moves upward toward the non-use position (e.g., because the steering column 100 is being removed therefrom), the left rack 350 and right rack 350 may urge the left pinion 352 and right pinion 352 to rotate in the counterclockwise rotation and clockwise direction, respectively (e.g., toward the open configuration). In some examples, a position of the pinions 352 remains the same or substantially similar relative to the base 310 (e.g., at the coupling member 342) as the pinions 352 rotate about the coupling members 342. In this manner, a space between the proximal portions 344 of the arms 340 may be sized and/or configured to accommodate the steering column 100 as the arms 340 move between the open configuration and closed configuration.

In some examples, a pair of guards 354 are positioned or configured to at least partially cover the vertical member 320 and/or arms 340 to facilitate reducing a likelihood of obstructing the engagement of the first teeth 346 with the second teeth 348. Additionally or alternatively, one or more guards 354 may at least partially cover the stoppers 328 and/or biasing members 334 to facilitate reducing a likelihood of obstructing the engagement of the vertical member 320 with the stoppers 328 and/or biasing members 334.

In some examples, each arm 340 includes a respective cover 356 coupled to a distal portion 358 thereof. The covers 356 define a space or opening 360 (shown in FIG. 4) therebetween. As shown in FIG. 5, when the arms 340 are in the closed configuration, the opening 360 is sized and/or configured to receive the steering column 100 therein. In some examples, the cover 356 includes a base layer fabricated from a polymer material, such as a LEXAN polycarbonate resin sheet material and molding compound, and a foam layer extending over or covering the polymer material. (LEXAN is a registered trademark of Sabic Global Technologies B.V.). The base layer provides support or rigidity, while the foam layer provides padding or softness. The terms "rigidity" and "softness" should be interpreted relative to each other regardless of their absolute hardness.

Figure 6:
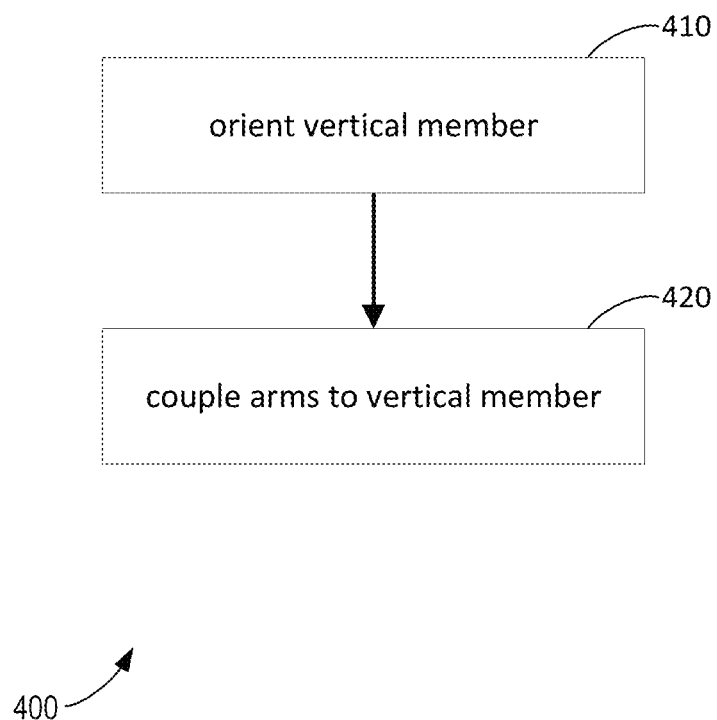
FIG. 6 is a flowchart of an example method for assembling the system shown in FIG. 2.

FIG. 6 shows an example method 400 of assembling a system for use in protecting a steering column 100 from debris, such as the jig 300. A vertical member 320 is oriented at operation 410 such that the vertical member 320 is configured to move generally vertically between a lower position (e.g., the in-use position shown in FIG. 3) and a upper position (e.g., the non-use position shown in FIG. 4). In some examples, the vertical member 320 is slidably coupled to a base 310 including a rail 326 mounted thereon. The vertical member 320 may be slideable, for example, along the rail 326 downwards toward the lower position or upwards toward the upper position. In some examples, downward and/or upward movement of the vertical member 320 is limited, restricted, and/or controlled by one or more stoppers 328 and/or biasing members 334. As shown in FIGS. 3 and 4, the stoppers 328 and/or biasing members 334 may be spaced from the rail 326. Alternatively, one or more stoppers 328 and/or biasing members 334 may be coupled and/or positioned adjacent to the rail 326.

One or more arms 340 are coupled to the vertical member 320 at operation 420 such that the arms 340 are configured to move toward a closed configuration (shown in FIG. 4) and facilitate protecting the steering column 100 from debris when the vertical member 320 is moved toward the lower position. Additionally or alternatively, the arms 340 may be configured to move toward an open configuration (shown in FIG. 3) and allow the steering column 100 to be coupled to the vertical member 320 when the vertical member 320 is moved toward the upper position. In some examples, the vertical member 320 includes or is coupled to one or more racks 350, and the arms 340 include or are coupled to one or more pinions 352. The racks 350 may cooperate with the pinions 352, for example, to translate linear motion of the vertical member 320 into rotational motion of the arms 340 and/or rotational motion of the arms 340 into linear motion of the vertical member 320. In some examples, the arms 340 and/or pinions 352 are rotatably coupled to the base 310. The arms 340 may be configured to rotate, for example, between the closed configuration and the open configuration.

During use, a steering column 100 may be loaded or positioned onto the vertical member 320. The weight of the steering column 100 urges the vertical member 320 to move downward (e.g., due to gravity). As the vertical member 320 moves downward toward the lower position, the arms 340 rotate toward the closed configuration, which decreases a distance between the distal portions 358 thereof. When the vertical member 320 is in the lower position and/or the arms 340 are in the closed configuration, an inner surface of a cover 356 at the distal portion 358 of the arms 340 may surround the steering column 100 and/or engage an outer surface of the steering column 100.

In this position and/or configuration, the jig 300 protects the steering column 100 from debris as one or more components are being coupled and/or uncoupled from the steering column 100. For example, the cover 356 may protect the steering column 100 from debris when the head of one or more fasteners (e.g., tamper-resistant fastener 232) is separated from the shaft to facilitate mounting the steering column 100 on a vehicle in a tamper-resistant manner. That is, the cover 356 may be configured to deflect or obstruct a path of one or more falling heads. In this manner, the steering column 100 may be protected from the accumulation of debris.

When the steering column 100 is lifted, the biasing members 334 may urge the vertical member 320 to move upward from the lower position. As the vertical member 320 moves upward from the lower position, the arms 340 rotate toward the open configuration, which increases the distance between the distal portions 358 thereof. The steering column 100 may be removed from the jig 300 when the vertical member 320 is in the upper position and/or the arms 340 are in the open configuration.

Example manufacturing systems are described herein and illustrated in the accompanying drawings. This written description uses examples to disclose aspects of the disclosure and also to enable a person skilled in the art to practice the aspects, including making or using the above-described systems and executing or performing the above-described methods. Examples described herein may be used to protect a steering column from the accumulation of debris. In this manner, the methods and systems described herein facilitate manufacturing and/or assembling one or more steering columns more consistently and/or efficiently.

Having described aspects of the disclosure in terms of various examples with their associated operations, it will be apparent that modifications and variations are possible without departing from the scope of the disclosure as defined in the appended claims. That is, aspects of the disclosure are not limited to the specific examples described herein, and all matter contained in the above description and shown in the accompanying drawings shall be interpreted as illustrative and not in a limiting sense. For example, the examples described herein may be implemented and utilized in connection with many other applications such as, but not limited to, other manufacturing systems.

Components of the systems and/or operations of the methods described herein may be utilized independently and separately from other components and/or operations described herein. Moreover, the methods described herein may include additional or fewer operations than those disclosed, and the order of execution or performance of the operations described herein is not essential unless otherwise specified. That is, the operations may be executed or performed in any order, unless otherwise specified, and it is contemplated that executing or performing a particular operation before, contemporaneously with, or after another operation is within the scope of the disclosure. Although specific features of various examples of the disclosure may be shown in some drawings and not in others, this is for convenience only. In accordance with the principles of the disclosure, any feature of a drawing may be referenced and/or claimed in combination with any feature of any other drawing.

When introducing elements of the disclosure or the examples thereof, the articles "a," "an," "the," and "said" are intended to mean that there are one or more of the elements. References to an "embodiment" or an "example" of the present disclosure are not intended to be interpreted as excluding the existence of additional embodiments or examples that also incorporate the recited features. The terms "comprising," "including," and "having" are intended to be inclusive and mean that there may be elements other than the listed elements. The phrase "one or more of the following: A, B, and C" means "at least one of A and/or at least one of B and/or at least one of C."

The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in protecting a steering column from debris, the system comprising:
    a pair of arms moveable between a closed configuration and an open configuration; and
    a vertical member configured to move toward a lower position when the steering column is positioned thereon, the vertical member coupled to the pair of arms such that the pair of arms move toward the closed configuration and facilitate protecting the steering column from the debris when the vertical member is moved toward the lower position.

2. The system of claim 1, further comprising a base, wherein the pair of arms are rotatably coupled to the base and the vertical member is slidably coupled to the base.

3. The system of claim 1, wherein the pair of arms move toward the open configuration when the vertical member is moved away from the lower position.

4. The system of claim 1, wherein the pair of arms include a pair of covers defining an opening sized to receive the steering column when the pair of arms are in the closed configuration.

5. The system of claim 1, wherein the pair of arms include a pair of pinions and the vertical member includes a pair of racks configured to engage the pair of pinions.

6. The system of claim 1, wherein the vertical member includes a plate element and a rod element extending generally upward from the plate element, the rod element sized to receive the steering column.

7. The system of claim 1, further comprising a stopper configured to restrict upward movement of the vertical member.

8. The system of claim 1, further comprising a stopper configured to restrict downward movement of the vertical member.

9. The system of claim 1, further comprising one or more biasing members configured to control movement of the vertical member.

10. The system of claim 1, further comprising a pair of guards configured to at least partially cover the pair of arms and the vertical member.

11. A system for use in protecting a steering column from debris, the system comprising:
    one or more arms moveable between a closed configuration and an open configuration; and
    a vertical member moveable between a first position and a second position, the vertical member configured to move toward the first position when the steering column is positioned thereon, the vertical member coupled to the one or more arms such that the one or more arms move toward the closed configuration when the vertical member is moved toward the first position and toward the open configuration when the vertical member is moved toward the second position.

12. The system of claim 11, further comprising a base, wherein the one or more arms are rotatably coupled to the base and the vertical member is slidably coupled to the base.

13. The system of claim 11, wherein the one or more arms include one or more covers configured to surround the steering column when the one or more arms are in the closed configuration and the steering column is positioned on the vertical member.

14. The system of claim 11, wherein the vertical member includes a plate element and a rod element extending generally upward from the plate element, the rod element sized to receive the steering column.

15. The system of claim 11, further comprising one or more of a stopper or a biasing member configured to control vertical movement of the vertical member.

16. The system of claim 11, further comprising one or more guards configured to at least partially cover the one or more arms and the vertical member.

17. A method of assembling a system for use in protecting a steering column from debris, the method comprising:
    orienting a vertical member such that the vertical member is configured to move generally vertically between an in-use position and a non-use position, the vertical member urged to move downward toward the in-use position when the steering column is positioned thereon; and
    coupling a pair of arms to the vertical member such that the pair of arms are configured to move toward a closed configuration and facilitate protecting the steering column from the debris when the vertical member is moved toward the in-use position.

18. The method of claim 17, further comprising mounting the vertical member on a rail such that the vertical member is slideable between the in-use position and the non-use position.

19. The method of claim 17, further comprising coupling the pair of arms to a base such that the pair of arms are rotatable between the closed configuration and an open configuration.

* * * * *